W. H. HALL.
SHEET METAL INK WELL AND CALENDAR HOLDER.
APPLICATION FILED APR. 14, 1909.
1,087,118.
Patented Feb. 17, 1914.
2 SHEETS—SHEET 1.
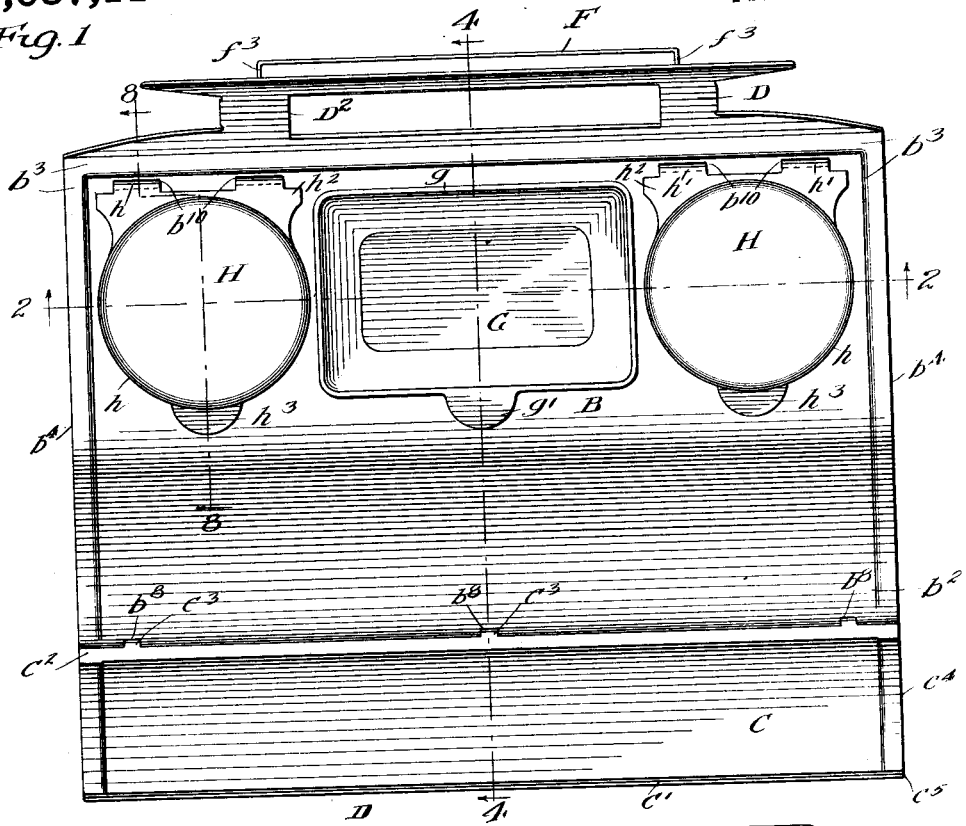
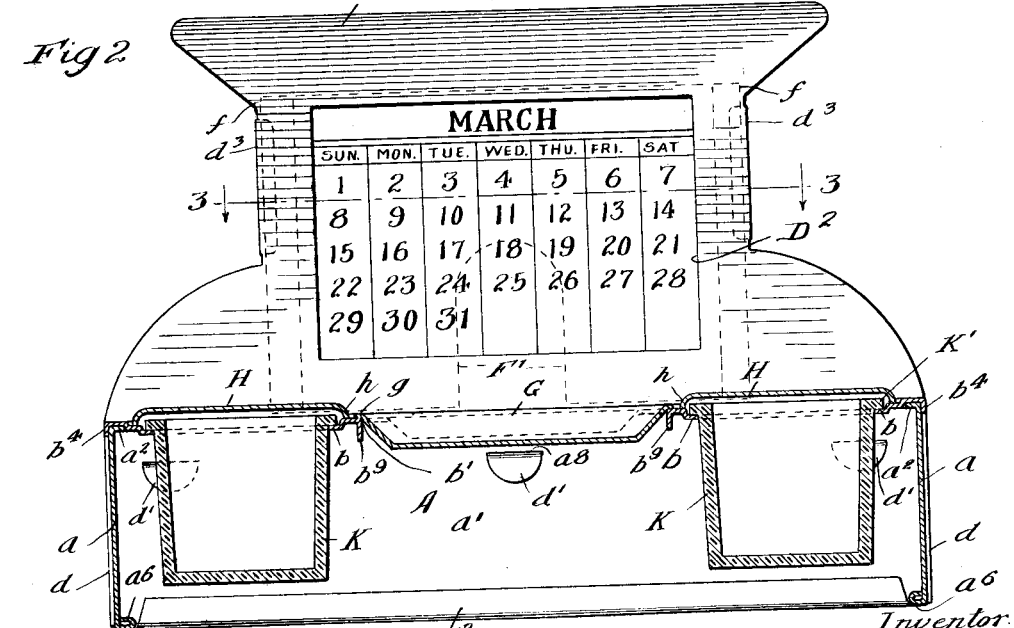
Witnesses:
Wm. Geiger
H. W. Munday
Inventor
William H. Hall
By Munday, Evarts, Adcock & Clarke.
Attorneys
COLUMBIA PLANOGRAPH CO., WASHINGTON, D. C.

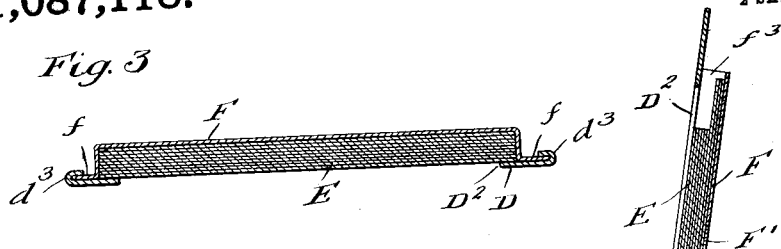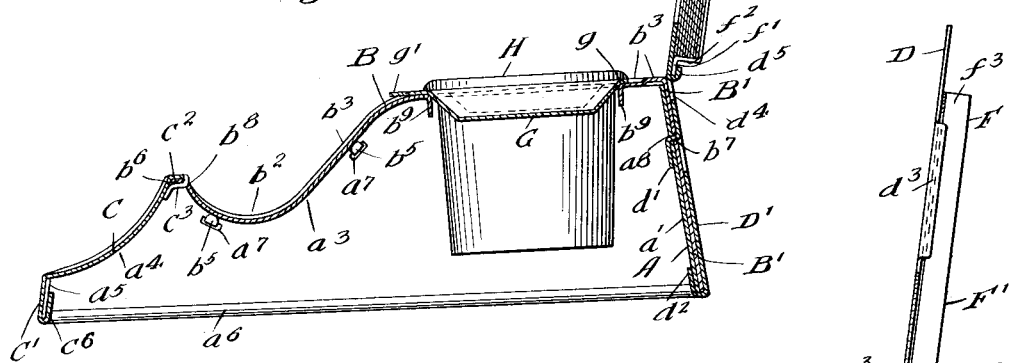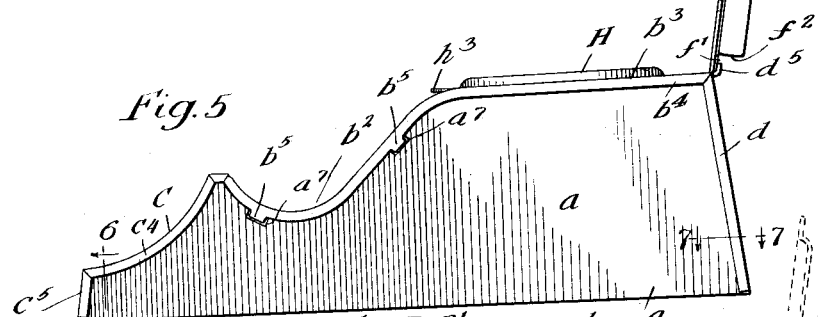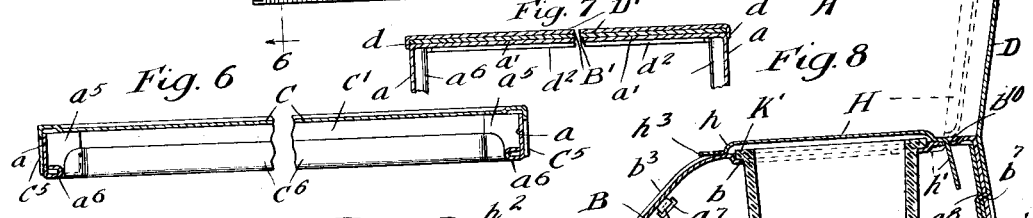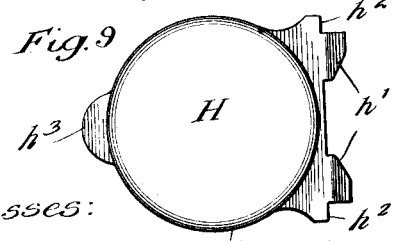

UNITED STATES PATENT OFFICE.

WILLIAM H. HALL, OF CLYDE, ILLINOIS, ASSIGNOR TO CHARLES W. SHONK COMPANY, OF MAYWOOD, ILLINOIS, A CORPORATION OF NEW JERSEY.

SHEET-METAL INK-WELL AND CALENDAR HOLDER.

1,087,118.  Specification of Letters Patent.  Patented Feb. 17, 1914.

Application filed April 14, 1909. Serial No. 489,789.

*To all whom it may concern:*

Be it known that I, WILLIAM H. HALL, a citizen of the United States, residing in Clyde, in the county of Cook and State of Illinois, have invented a new and useful Improvement in Sheet-Metal Ink-Well and Calendar Holders, of which the following is a specification.

My invention relates to improvements in sheet metal ink stands or inkwell and calendar holders.

The object of my invention is to provide a sheet metal ink well and calendar holder of a simple, efficient and durable construction, capable of being cheaply manufactured, and having a pen holder trough, hinged covers for the ink wells and a removable ash or pen tray.

My invention consists in the novel construction of parts and devices, and in the novel combinations of parts and devices herein shown and described and more particularly specified in the claims.

In the accompanying drawing forming a part of this specification, Figure 1 is a plan view of a sheet metal ink well and calendar holder embodying my invention. Fig. 2 is a vertical section on line 2—2 of Fig. 1. Fig. 3 is a horizontal section on line 3—3 of Fig. 2. Fig. 4 is a vertical cross section on line 4—4 of Fig. 1. Fig. 5 is a side elevation. Fig. 6 is a vertical section on line 6—6 of Fig. 5. Fig. 7 is a partial horizontal section on line 7—7 of Fig. 5. Fig. 8 is a partial vertical section on line 8—8 of Fig. 1, and Fig. 9 is a detail plan view of one of the ink well covers.

My improved sheet metal ink well and calendar holder comprises in combination, an upright side-and-back member A forming the two upright sides $a\ a$ and back $a^1$ in one integral piece, a top member B having an integral intermediate back $B^1$, and provided with ink well sockets $b\ b$, ash or pen tray socket $b^1$ and pen or pencil holder trough $b^2$, a front member C, a calendar front plate D having a back member $D^1$, a calendar socket-member F secured to the calendar front plate to receive the calendar cards E, ink well covers H having integral combined hinge and stop lips fitting in hinge combined slots of the top member, a removable ash or pen tray G, removable ink wells K.

The upright side and back member A is provided with integral horizontal flanges $a^2$ at the upper edges of the sides $a\ a$ to receive and support the top B, and with curved or trough shaped edges $a^3$ to receive the trough shaped portion $b^2$ of the top B and with curved edges $a^4$ to receive the curved front C and with integral right angle lips $a^5$ for the upright portion $c^1$ of the front plate C to fit against. The upright sides $a\ a$ of the member A are also provided at their lower horizontal edges with inwardly and upwardly turned folds or flanges $a^6$ to strengthen the upright sides and to give them a smooth lower edge.

The sheet metal top plate or member B is provided with a marginal raised rib $b^3$ at its back and side edges and with downturned flanges $b^4$ at its side edges which embrace the upright sides $a\ a$ of the holder, and which flanges are furnished with a plurality of integral tongues $b^5$ which are inserted through slots $a^7$ in the upright sides and clenched over so as to securely unite the top B with the upright sides. At its front edge the top plate or member B is provided with a horizontal flange $b^6$ to receive the corresponding flange $C^2$ of the front plate C, said flange $C^2$ having integral tongues $C^3$ inserted through slots $b^8$ in the top plate B at the front edge thereof and clenched over to secure the front plate C to the top plate and thus to the upright sides $a\ a$. The integral back extension $B^1$ of the top plate B overlap the back $a^1$.

The front plate C is provided at its ends with curved flanges $C^4$ and upright flanges $C^5$ which embrace the upright sides $a\ a$ of the holder and at its lower edge with an upturned flange or fold $C^6$ which embraces the inturned ends or lips $a^5$ of the upright sides $a\ a$ and thus serves to secure the front C to the upright sides $a\ a$ of the member A. This upright flange or fold $C^6$ also serves to give a smooth front lower edge to the holder.

The calendar front plate D, which constitutes the outer back plate of the combined holder, has an opening $D^2$ through which the calendar cards are exposed to view, and is provided with right angle flanges $d$ which embrace the rear end edges of the upright sides $a\ a$ and is provided with integral tongues $d^1$ which are inserted through slots $b^7$ in the back plate extension $B^1$ of the top plate B, and also through registering slots $a^8$ of the combined back and side member A, said tongues or lips $d^1$ being turned or clenched down so as to securely connect the calendar front plate with the side-and-back member A and with the top member B. The calendar front plate, which also constitutes the outer back plate of the holder, is further secured to said members A and B by an inwardly and upwardly turned fold or flange $d^2$ at the lower horizontal edge of said calendar front plate D. The calendar front plate D is provided at its outer upright edges with backwardly and inwardly turned folds or flanges $d^3$ which are folded over the marginal horizontal flanges $f$ of the calendar back or pocket plate F, and it is also provided just below the top plate B with a horizontal slot $d^4$ and an inwardly and upwardly turned fold or flange $d^5$ which embraces the horizontal marginal flange $f^1$ of the calendar back or pocket plate F, thus securing said calendar back plate F to the calendar front plate D.

The calendar pocket plate F is provided with a right angle horizontal flange $f^2$ and with right angle upright flanges $f^3$ to cause the same when united with the calendar front plate D to form a pocket to receive the removable calendar cards E. The calendar back plate F is furnished with a central upright slot $F^1$ at its lower portion to admit the thumb or finger for convenience in removing the calendar cards E.

The removable tray G for reception of cigar ashes, pens or other articles is provided with a marginal flange $g$ and with an integral lip or finger piece $g^1$ for convenience in removing the same. The socket $b^1$ in the top plate B in which the tray G fits is preferably furnished with downturned flanges $b^9$ at its sides and ends.

The removable sheet metal ink well covers H are each provided with a marginal rim or flange $h$ to overlap the upper or mouth end of the ink well K, and with integral hinge lips or tongues $h^1$ projecting backwardly at an obtuse angle to the top face of the cover H, and which are inserted through hinge slots $b^{10}$ in the top plate B at the rear of each ink well socket $b$, so that these hinge lips will also serve by engagement with the under face of the top plate B as stops to limit the opening movement of the hinged covers. The hinged covers H are also preferably furnished with projecting lugs or shoulders $h^2$ at the outer edges of the hinge lips $h^1$. The hinged covers H are also each preferably provided with an integral lip or thumb piece $h^3$ at the front edge for convenience in opening same.

The removable ink wells K are preferably of glass, and furnished at the upper ends with marginal shoulders $K^1$ to fit in the annular ink well sockets or recesses $b\ b$.

I claim:—

1. The combination with a sheet metal ink well holder, of a sheet metal calendar holder front plate and a sheet metal pocket plate secured to said ink well holder and extending thereabove, said front plate and pocket plate being permanently secured together to form a pocket therebetween for holding calendar cards, substantially as specified.

2. The combination with a sheet metal ink well holder, of a front plate and a pocket plate secured together to form a calendar card holding pocket therebetween, said front plate having a fold at its lower edge embracing the lower edge of the back portion of said ink well holder, substantially as specified.

3. The combination with a sheet metal ink well holder, of a front plate and a pocket plate secured together to form a calendar card holding pocket therebetween, said front plate of said calendar card holder having integral lips, and the back portion of said ink well holder having slots through which said lips are inserted to secure said parts together, substantially as specified.

4. The combination with a sheet metal ink well holder, of a front plate and a pocket plate secured together to form a calendar card holding pocket therebetween, said front plate of said calendar card holder having integral lips, and the back portion of said ink well holder having slots through which said lips are inserted to secure said parts together, and said front plate of said calendar holder having a fold at its lower edge embracing the lower edge of the back portion of said ink well holder, substantially as specified.

5. In a sheet metal ink well and calendar holder, the combination of a back plate furnished with slots, of a calendar front plate fitting against said back plate and having lips inserted through said slots in said back plate, said calendar front plate being provided at its lower edge with a fold embracing the lower edge of said back plate, substantially as specified.

6. In a sheet metal ink well and calendar holder, the combination of a back plate furnished with slots, of a calendar front plate fitting against said back plate and having lips inserted through said slots in said back plate, and a calendar pocket plate secured to said calendar front plate, substantially as specified.

7. In a sheet metal ink well and calendar holder, the combination of a back plate furnished with slots, of a calendar front plate fitting against said back plate and having lips inserted through said slots in said back plate, and a calendar pocket plate secured to said calendar front plate, said calendar front plate having folds at its upright edges embracing the upright edges of said calendar pocket plate, substantially as specified.

8. A combined ink well and calendar holder comprising a top plate having an integral back, upright sides having an integral back and a calendar front plate having an integral back, said backs being provided with integral means for securing them together, substantially as specified.

9. A combined ink well and calendar holder comprising a top plate having an integral back, a second plate having integral upright sides and back, and a calendar front plate having an integral back, all three of said backs being overlapped and secured to each other to thereby form a strong, rigid structure, and a calendar pocket plate secured to the calendar front plate to thereby form a pocket therebetween adapted to hold calendar cards, said calendar front plate having a folded edge embracing the lower edge of said calendar pocket plate, substantially as specified.

WILLIAM H. HALL.

Witnesses:
EDMUND ADCOCK,
H. M. MUNDAY.